United States Patent [19]

Mulder

[11] 4,061,456

[45] Dec. 6, 1977

[54] EXTRUDER FOR THE MANUFACTURE OF A SYNTHETIC RESIN FOIL IN THE SHAPE OF A SERPENTINE STRIP

[75] Inventor: Franciscus Elbertus Mulder, Putten, Netherlands

[73] Assignee: Proost en Brandt N.V., Amsterdam, Netherlands

[21] Appl. No.: 627,267

[22] Filed: Oct. 30, 1975

[30] Foreign Application Priority Data

Nov. 1, 1974 Netherlands .......................... 7414315

[51] Int. Cl.² .............................................. B29F 3/08
[52] U.S. Cl. ................................. 425/140; 425/378 R
[58] Field of Search .................... 425/140, 378 R, 461, 425/72, 376; 137/580, 625.13, 626.15

[56] References Cited

U.S. PATENT DOCUMENTS

| | | | |
|---|---|---|---|
| 3,068,517 | 12/1962 | Blackmore | 425/376 R |
| 3,170,011 | 2/1965 | Cheney et al. | 425/140 X |
| 3,341,888 | 9/1967 | Bridge et al. | 425/140 |
| 3,649,143 | 3/1972 | Papesh et al. | 425/72 X |
| 3,700,370 | 10/1972 | Hearns et al. | 425/140 |
| 3,894,558 | 7/1975 | Pedersen | 137/580 |
| 3,918,486 | 11/1975 | Cyphelly | 137/580 |

*Primary Examiner*—Richard B. Lazarus
*Attorney, Agent, or Firm*—Snyder, Brown & Ramik

[57] ABSTRACT

Synthetic resin extruder comprising a rotatable extrusion head surrounded by a hollow ring rigidly secured, the interior of the ring communicating with a controllable supply of air for the head, said ring having an outer sliding face, in which are provided a number of passages equally spaced apart and closed by non-return valves having a portion projecting out of the sliding face, said face co-operating with a spring-controlled stationary shoe with a depression being provided with an air supply and the bottom of the depression co-operating with the valves to urge these into the open position.

12 Claims, 4 Drawing Figures

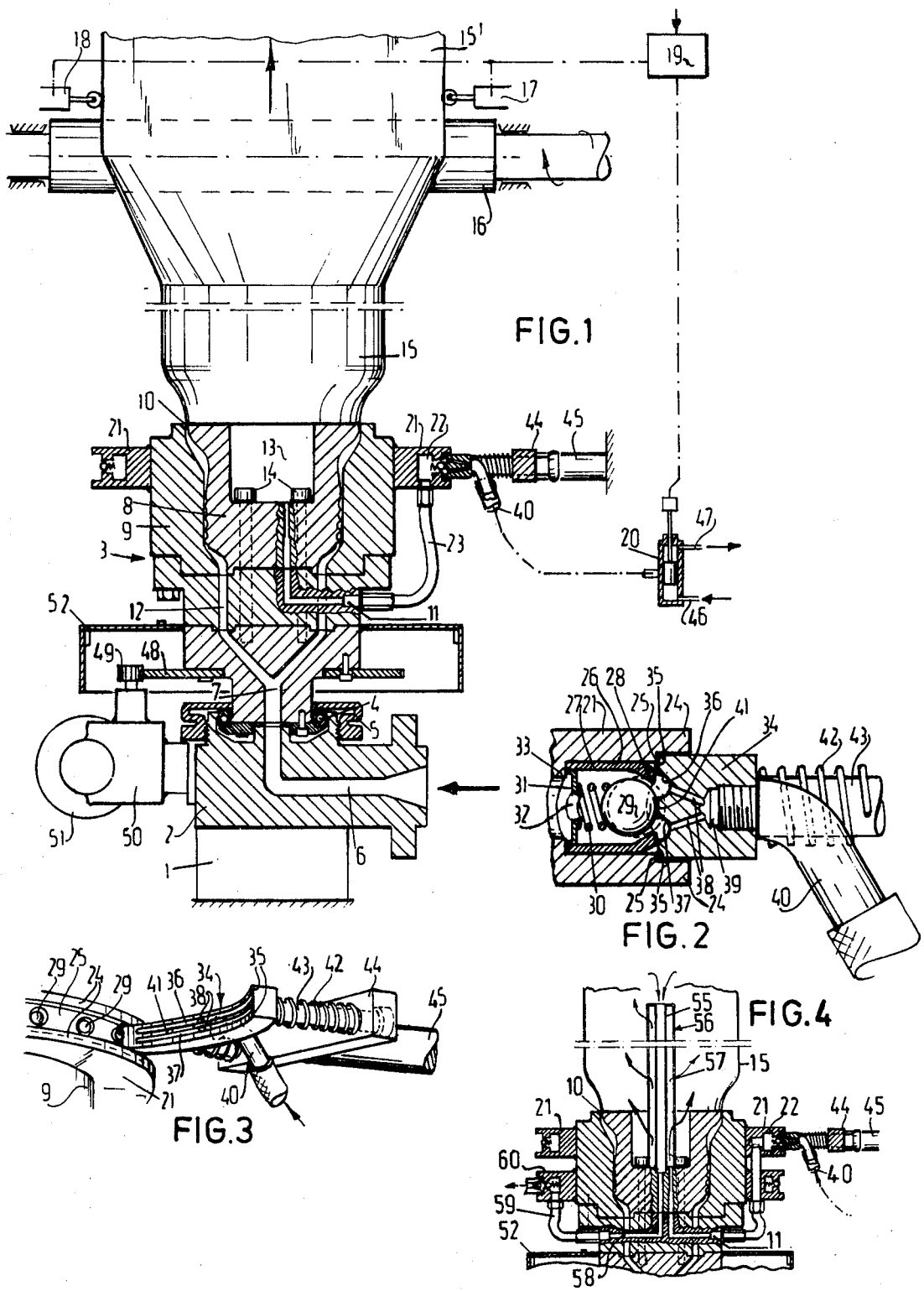

EXTRUDER FOR THE MANUFACTURE OF A SYNTHETIC RESIN FOIL IN THE SHAPE OF A SERPENTINE STRIP

The invention relates to an extruder for the manufacture of a synthetic resin foil in the shape of a serpentine strip, said extruder comprising a rotatable extrusion head and a terminal for the controllable supply of air to the spraying head in order to maintain a given excess pressure inside the forming strip of synthetic resin. The prior art extruders of this kind comprise a detachable air terminal on the extrusion head. When the volume of air in the strip changes by loss of air or by temperature fluctuations, air has to be conducted away or supplied, to which end an air hose is connected with the terminal by means of a quickrelease. After the desired conditions have been re-established, the air supply hose has to be removed, since it would otherwise wind around the head. The establishment of a connection with the rotating head through a rotating coupling gives rise to difficulties. The extrusion head is heated and due to temperature changes it is difficult to maintain the seal. If leakage occurs in the area of the air supply terminal, additional cooling is involved, which further aggravates the sealing problem, whilst a varying temperature of the head adversely affects the quality of the product.

The invention has for its object to provide a solution of the problem involved, in which said disadvantages are obviated.

According to the invention the extrusion head is surrounded by a hollow ring rigidly secured thereto or forming part thereof, the interior of said ring communicating with the air supply terminal for the head, whilst the outer wall of the ring has a plurality of passages equally spaced apart in the circumferential direction and closed by non-return valves urged in the outward direction by spring force against the associated seats, said valves having a portion projecting out of the outer surface of the wall in the closed state, the outer surface of said wall being constructed in the form of a sliding face, with which co-operates a spring-controlled shoe having a depression, the edges of which co-operate in sealing fashion with the sliding face, said depression being provided with an air supply terminal, whilst the bottom of the depression or an elevated part formed on said bottom co-operates with the projecting portions of said valves in order to urge the same into the open position, the depression covering a distance in the circumferential direction which at least corresponds with the distance between two openings plus twice the diameter of said openings. With such a construction of the synthetic resin extruder, if an adequate number of apertures is provided, it is possible to use a comparatively short shoe, whilst the relatively co-operating faces can readily maintain a satisfactory seal. The space inside the shoe constantly communicates with the interior of the ring, which interior constantly communicates with the air supply terminal of the head. It is then possible to dispose the supply terminal on the side of the extrusion head, which provides an optimum flow of the molten synthetic resin in the head.

In an effective embodiment of the extruder in accordance with the invention the cross section of the ring is a U-shaped profile, the flanges of which extend radially in an outward direction, whilst the air supply shoe has the shape of a ring segment located between the limbs of the U, the openings with the non-return valves being arranged in the web of the U. The flanges provide a satisfactory guide of the shoe with respect to the sliding surface of the ring, whilst in addition the seal may be optimal.

According to the invention the valves may be formed by balls. The seats of the ball-shaped valves may then be located at such a distance below the outer face of the ring that, when engaging the seats, the balls project by a segment portion out of the sliding face. This has the advantage that the balls can turn to some extent during the passing of the shoe edges so that constantly a new sealing surface becomes available.

In an effective embodiment the shoe may cover such a length that at least three openings are covered by the shoe so that when one opening is released, a further opening is simultaneously covered. Thus a practically constant passage is formed through the openings in the sliding surface.

In a particularly simple embodiment the sliding face of the shoe may have milled in it two slits extending side by side in the circumferential direction and separated by a dam, said slits terminating at a given distance from the end edges and communicating each with the air supply, the dam between the slits serving to push the valves open, whilst the width of the dam is smaller than the diameter of the openings. As soon as the dam is in contact with a valve, the air can flow on either side of the dam towards the slits.

In a synthetic resin extruder comprising a rotatable head the dimensions of the serpentine strip can be controlled and be kept constant in a simple manner by providing means for measuring the breadth of the flattened strip, said measuring device producing a pulse in the event of a departure from the desired size to a control-member regulating the air supply to the shoe. As soon as the strip becomes too wide, the air supply to the head is reduced or air is conducted away. If the strip becomes too narrow, additional air is supplied.

The invention also relates to a synthetic resin extruder, in which the extrusion head has been provided with a double walled pipe extending inside the just formed part of the serpentine strip and the outer wall has been provided with passages for air. According to the invention the space between the double walls is connected with the hollow ring surrounding the head and the central pipe is connected with a second hollow ring surrounding the head, second ring being constructed in the way as described before and said ring being connected with a device for discharging the air.

The invention will be described more fully in the following description of one embodiment of a device in accordance with the invention shown in the drawing. In the drawing:

FIG. 1 shows an extrusion device according to the invention in a sectional view, FIG. 2 shows a detail of FIG. 1, FIG. 3 is a perspective view of the detail of FIG. 2, and FIG. 4 is a part of the device of FIG. 1 in another embodiment.

On a stationary support 1 there is disposed the frame 2 of an extrusion device. A rotatable head 3 is rotatably journalled by means of a bearing 4 in the frame 2. The bearing 4 is an axial bearing capable of absorbing in an axial direction the pressure exerted by the synthetic material to be extruded. The bearing 4 is covered by a hood 5. The stationary frame 2 has a supply channel for the synthetic resin, which channel communicates with the channels 7 in the rotatable head 3. The channels 7 join the passage in the top portions 8 and 9 of the head 3. In the space between the portions 8 and 9 the extrusion opening 10 proper is formed at the free end. The head 3 has an air terminal 11 communicating with a channel 12, which opens out in the hollow space 13 near the top end of the portion 8. In the hollow space 13 are located the heads 14 of bolts by means of which the portion 8 is secured to the lower part of the head 3. A strip of synthetic resin 15 emerges from the opening 10 and through the air terminal 11 air is supplied thereto so that the strip 15 assumes the shape of an inflated serpent. At a given distance beyond the opening 10 the material of the strip 15 will no longer expand because it has cooled to a sufficient extent. The strip 15 is then pinched to flatness between two rotating rollers 16, one of which is shown, and subsequently it is wound on a reel (not shown). The flattened strip 15' is measured in the direction of width by means of feelers 17 and 18. The feelers 17 and 18 apply a pulse to a regulator 19, which supplies, in the event of a departure of the width of the strip 15' from a predetermined value a pulse to a control-device 20, the operation of which will be described more fully hereinafter.

FIG. 1 shows that the head 3, that is to say, the portion 9 is surrounded by a ring 21. This ring encloses an annular chamber 22, which communicates through a hose 23 with the terminal 11.

From FIG. 2 it will be apparent that the ring 21 has, on its outer side, a U-shaped profile having flanges 24. The web of the U-shaped section has a sliding surface 25, in which openings 26 are provided. The openings 26 receive a sleeve 27, whose rim 28, which is coplanar with the sliding surface 25, constitutes a seat for a ball 29 located inside the sleeve. The ball is urged by a spring 30 against the seat 28, the spring being supported from a plate 31, which is fastened in the sleeve 27 and which has a passage 32. The sleeve 27 is pressed into the opening 26 and is supported from a shoulder 33. Inside the flanges 24 a segment-shaped shoe 34 is arranged so that its sliding surface 35 cooperates with the sliding surface 25 of the ring 21. The shoe 34 has two slits 36 and 37. The slits communicate through channels 38 with a bore 39, which is joined by an air supply conduct 40. The slits do not extend up to the ends of the surfaces 35 so that the slits 36 and 37 are completely surrounded by a sliding surface 35. Between the slits 36 and 37 a dam 41 is left, the width of which is smaller than the diameter of the opening in the sleeve 27. The shoe 34 is urged against the sliding surface 25 by means of springs 42, which surround two guide rods 43, which pass through a bridge member 44 rigidly secured by means of a holder 45 to part of the frame of the extrusion device. The length of the shoe 34 is chosen so that a plurality of openings 28 with the balls 29 are covered. It will be seen from FIG. 2 that, when the segment covers a ball, the dam 41 will lift this ball against the force of the spring 30 from its seat so that an open communication is established between the slits 36 and 37 and the space 22 inside the ring 21. When the head 3 is rotating, the shoe will always cover a number of balls and since these balls are lifted from the seats, there will always be a communication between the air supply conduct 40 and the space 22 inside the ring 21 and hence through the duct 23 and the terminal 11 with the space 13 inside the portion 8 and hence with the open space inside the formed strip of synthetic resin 15. Through the control-device 20 air can be supplied to the duct 40 via the conduit 46 in dependence upon the width of the strip 15' or air may be conducted away through the duct 47. As a further alternative the conduct 40 may be kept in the closed state.

The length of the segment 34 is preferably such that invariably three balls 29 are covered, whilst at the release of one of them the next-following ball is simultaneously covered.

The rotatable head 3 is driven through a gear wheel 48 and a pinion 49, which is driven via a worm drive 50 and an electric motor 51. The gear wheels 48 and 49 are protected by a screening hood 52 rotating together with the head 3.

FIG. 4 shows the device of FIG. 1 in which the embodiment has been changed. The corresponding parts of the device are indicated in FIG. 4 with the same numbers. On the extrusion head a double walled pipe has been mounted, said pipe extending inside the serpentine strip 15. The double walled pipe consists of a central pipe 55 and an outer pipe 56 which has been provided with air passages 57. The space between the pipes 55 and 56 is connected with the ring 21. The inner pipe 55 is connected through an additional canal 58 and a duct 59 with a similarly constructed ring 60. The ring 60 is connected with a device for exhausting the air. Through the ring 21 cooling air is provided. Said air cooling the produced strip 15. The warm air is discharged through the ring 60. The pressure of the air inside the strip 15 can be controlled as has been described by supplying respectively discharging a bigger or a smaller amount of air.

What I claim is:

1. An extruder for the manufacture of a synthetic resin foil in the shape of a serpentine strip, said extruder comprising a rotatable extrusion head and a terminal for the controllable supply of air to the extrusion head in order to maintain a given excess pressure inside the forming strip of synthetic resin, characterized in that the rotatable extrusion head includes a hollow ring rotating with the head, the interior of said ring communicating with the air supply terminal for the head, in that an outer wall of the ring has a plurality of passages equally spaced apart in the circumferential direction and closed by non-return valves urged in the outward direction by spring force against the associated seats, said valves having a portion projecting out of the outer surface of said wall in the closed state, in that the outer surface of said wall being constructed in the form of a sliding face, with which sliding face cooperates a stationary shoe having a depression, which shoe is spring pressed against said sliding face and the edges of which shoe co-operate in sealing fashion with the sliding face, said depression being provided with an air supply terminal, and in that the shoe engages the projecting portions of those valves lying beneath the shoe in order to urge such valves into the open position, the depression covering in the circumferential direction a distance at least corresponding with the distance between two passages plus twice the diameter of said passages.

2. A synthetic resin extruder as claimed in claim 1, characterized in that the cross section of the ring is a U-shaped profile, the flanges of which extend radially in the outward direction, and in that the air supply shoe has the shape of a ring segment located between the flanges of the U, whereas the passages with the non-return valves are located in the web of the U.

3. A synthetic resin extruder as claimed in claim 1 characterized in that the valves are formed by balls.

4. A synthetic resin extruder as claimed in claim 1 characterized in that the shoe has such a length that at least three passages are covered by the shoe so that at the release of one of the passages a further passages is simultaneously covered.

5. A synthetic resin extruder as claimed in claim 1 characterized in that the sliding face of the shoe has milled in it two slits extending side by side in the circumferential direction and separated by a dam, said slits terminating at a given distance from the end edges and communicating each with the air supply, the dam between the slits serving to push the valves open, whilst the width of the dam is smaller than the diameter of the passages.

6. A synthetic resin extruder as claimed in claim 1 characterized in that means are provided for measuring the width of the flattened strip and in that in the event of a departure from the desired size the measuring device supplies a pulse to a control-device which regulates the air supply to the shoe.

7. A synthetic resin extruder as claimed in claim 1 in which the extrusion head has been provided with a double walled pipe extending inside the just formed part of the serpentine strip and the outer wall has been provided with passages for air characterized in that the space between the double wall is connected with said hollow ring and that the central pipe is connected with a second hollow ring rotating with the head, said second ring being constructed in the same way as the ring first mentioned, a second shoe cooperating with said second ring in the same way as the shoe first mentioned cooperates with the ring first mentioned, and said second ring being connected with a device for discharging the air whereby air continuously flows into and out of said strip.

8. In an extruding system for synthetic resin, a rotatable extrusion head defining a circumferentially extending extrusion opening, means for feeding synthetic resin to said rotatable extrusion head to issue through said extrusion opening in the form of a tube, flattening means spaced from said rotatable extrusion head for flattening said tube whereby that section of the tube between said rotatable extrusion head and said flattening means defines a closed chamber, and inflating means for maintaining fluid pressure within said closed chamber whereby to attain a desired width of the flattened tube, the improvement wherein:

said inflating means includes a circumferentially extending portion on said rotatable extrusion head defining a fluid manifold communicating through said rotatable extrusion head with said closed chamber, said portion presenting a circumferentially extending exterior surface provided with circumferentially spaced openings communicating with said fluid manifold, a check valve means associated with each of said openings and projecting therethrough for normally closing said openings, a nonrotatable shoe bearing upon said exterior surface and cooperable with said check valve means sequentially to open them as the extrusion head rotates with respect to said shoe, and fluid conduit means connected with said shoe for communication with said manifold through the sequentially opened check valve means to maintain said fluid pressure within said closed chamber.

9. In an extruding system as defined in claim 8 including control valve means connected to said fluid conduit means for selectively supplying pressurized fluid and exhausting fluid through said fluid conduit means, and regulating means responsive to the width of said flattened tube for controlling said control valve means to maintain said desired width of the flattened tube.

10. In an extruding system as defined in claim 8 wherein said shoe is of a circumferential length sufficient simultaneously to open at least two check valve means.

11. In an extruding system as defined in claim 9 wherein said shoe is of a circumferential length sufficient simultaneously to open at least two check valve means.

12. In an extruding system as defined in claim 8 wherein said inflating means includes a second circumferentially extending portion on said rotatable extrusion head defining a second fluid manifold communicating through said rotatable extrusion head with said closed chamber, said second portion presenting a circumferentially extending exterior surface provided with circumferentially spaced second openings communicating with said second fluid manifold, a check valve means associated with each of said second openings and normally projecting therethrough, a non-rotatable second shoe bearing upon the exterior surface of said second portion and cooperable with said second check valve means sequentially to open them as the extrusion head rotates with respect to said second shoe, and second fluid conduit means connected with said second shoe for communication with the manifold of said second portion through said sequentially opened second check valve means to bleed fluid from said closed chamber.

* * * * *